United States Patent
Deng et al.

(10) Patent No.: US 11,296,604 B2
(45) Date of Patent: Apr. 5, 2022

(54) SWITCHING CONVERTER, CONTROL CIRCUIT AND CONTROL METHOD THEREOF

(71) Applicant: Silergy Semiconductor Technology (Hangzhou) LTD, Hangzhou (CN)

(72) Inventors: Jian Deng, Hangzhou (CN); Hongbin Lai, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

(21) Appl. No.: 17/073,582

(22) Filed: Oct. 19, 2020

(65) Prior Publication Data
US 2021/0135585 A1    May 6, 2021

(30) Foreign Application Priority Data
Oct. 31, 2019  (CN) .......................... 201911051059.2

(51) Int. Cl.
*H02M 3/335* (2006.01)
*H02M 3/00* (2006.01)

(52) U.S. Cl.
CPC ... *H02M 3/33515* (2013.01); *H02M 3/33507* (2013.01); *H02M 3/33584* (2013.01); *H02M 3/33592* (2013.01); *H02M 3/01* (2021.05)

(58) Field of Classification Search
CPC ......... H02M 3/33515; H02M 3/33507; H02M 3/33584; H02M 3/33592; H02M 3/01; H02M 3/33553; H02M 1/08
See application file for complete search history.

(56) References Cited

U.S. PATENT DOCUMENTS

| | | | |
|---|---|---|---|
| 6,005,780 A | 12/1999 | Hua | |
| 6,580,258 B2 | 6/2003 | Wilcox et al. | |
| 8,964,417 B1* | 2/2015 | Shen | H02M 3/33507 363/21.02 |
| 9,209,696 B1* | 12/2015 | Shen | H02M 3/156 |
| 9,325,254 B2 | 4/2016 | Deng et al. | |
| 9,331,588 B2 | 5/2016 | Chen | |
| 9,488,680 B2 | 11/2016 | Xu | |
| 9,698,695 B1* | 7/2017 | Fahlenkamp | H02M 1/32 |
| 10,804,805 B1* | 10/2020 | Radic | H02M 7/48 |
| 2007/0121258 A1* | 5/2007 | Hachiya | H02M 3/33507 361/18 |
| 2009/0034302 A1* | 2/2009 | Cannella | H02M 3/156 363/56.1 |
| 2011/0305053 A1* | 12/2011 | Lin | H02M 3/33523 363/95 |
| 2012/0049822 A1* | 3/2012 | Li | H02M 3/156 323/282 |
| 2014/0016365 A1* | 1/2014 | Maruyama | H02M 3/33507 363/21.02 |

(Continued)

*Primary Examiner* — Yusef A Ahmed

(57) ABSTRACT

A control circuit for controlling a power stage circuit of a switching converter, where the power stage circuit includes a magnetic component and a power switch, can include: the control circuit being configured to determine a turn-on trough of a current cycle by determining whether a time signal corresponding to a lock-on trough of the current cycle is within a threshold range, thereby controlling the power switch to be turned on at the determined turn-on trough; and whereby an ordinal number of the lock-on trough of the current cycle is the same as an ordinal number of the turn-on trough of the last cycle.

17 Claims, 12 Drawing Sheets

(56) References Cited

U.S. PATENT DOCUMENTS

| | | | |
|---|---|---|---|
| 2014/0078789 A1 | 3/2014 | Li et al. | |
| 2014/0239934 A1 | 8/2014 | Zhang | |
| 2014/0313786 A1* | 10/2014 | Chen | H05B 45/385 |
| | | | 363/21.01 |
| 2015/0160270 A1 | 6/2015 | Shi et al. | |
| 2015/0280578 A1 | 10/2015 | Huang et al. | |
| 2016/0020699 A1* | 1/2016 | Shen | H02M 1/44 |
| | | | 363/15 |
| 2016/0190936 A1* | 6/2016 | Ke | H02M 3/33507 |
| | | | 363/21.12 |
| 2016/0241150 A1* | 8/2016 | Hsu | H02M 1/08 |
| 2017/0054374 A1* | 2/2017 | Fang | H02M 3/33523 |
| 2017/0063241 A1* | 3/2017 | Yang | H02M 3/33507 |
| 2017/0214325 A1* | 7/2017 | Chang | H02M 1/08 |
| 2017/0324345 A1* | 11/2017 | Stuler | H02M 1/08 |
| 2018/0013352 A1* | 1/2018 | Cao | H02M 1/08 |
| 2018/0076721 A1* | 3/2018 | Cannenterre | H02M 3/33507 |
| 2018/0316273 A1* | 11/2018 | Chen | H02M 1/32 |
| 2018/0337607 A1* | 11/2018 | Drda | H02M 1/088 |
| 2019/0006935 A1* | 1/2019 | Wang | H02M 1/08 |
| 2019/0252966 A1* | 8/2019 | Radic | H02M 1/08 |
| 2019/0356231 A1* | 11/2019 | Radic | H02M 3/33576 |
| 2019/0363635 A1* | 11/2019 | Lin | H02M 3/33592 |
| 2020/0195124 A1* | 6/2020 | Mayell | H02M 3/33569 |
| 2020/0195161 A1* | 6/2020 | Mayell | H02M 3/33569 |
| 2020/0287457 A1* | 9/2020 | Su | H02M 1/083 |
| 2020/0313563 A1* | 10/2020 | Hyugaji | H02M 3/33592 |
| 2021/0028695 A1* | 1/2021 | Su | H02M 1/44 |

* cited by examiner

| Binary format | | | | | Determined trough value |
|---|---|---|---|---|---|
| Drn | ... | Dr2 | Dr1 | Dr0 | |
| 0 | ... | 0 | 0 | 0 | 0 |
| 0 | ... | 0 | 0 | 1 | 1 |
| 0 | ... | 0 | 1 | 0 | 2 |
| 0 | ... | 0 | 1 | 1 | 3 |
| 0 | ... | 1 | 0 | 0 | 4 |
| 0 | ... | 1 | 0 | 1 | 5 |
| 0 | ... | 1 | 1 | 0 | 6 |
| 0 | ... | 1 | 1 | 1 | 7 |
| ... | ... | ... | ... | ... | ... |
| 1 | ... | 1 | 1 | 1 | $2^{n+1}-1$ |

FIG. 6

| Binary format | | | | | Current trough value |
|---|---|---|---|---|---|
| Dfn | ... | Df2 | Df1 | Df0 | |
| 0 | ... | 0 | 0 | 0 | 0 |
| 0 | ... | 0 | 0 | 1 | 1 |
| 0 | ... | 0 | 1 | 0 | 2 |
| 0 | ... | 0 | 1 | 1 | 3 |
| 0 | ... | 1 | 0 | 0 | 4 |
| 0 | ... | 1 | 0 | 1 | 5 |
| 0 | ... | 1 | 1 | 0 | 6 |
| 0 | ... | 1 | 1 | 1 | 7 |
| ... | ... | ... | ... | ... | ... |
| 1 | ... | 1 | 1 | 1 | $2^{n+1}-1$ |

FIG. 7

SWITCHING CONVERTER, CONTROL CIRCUIT AND CONTROL METHOD THEREOF

RELATED APPLICATIONS

This application claims the benefit of Chinese Patent Application No. 201911051059.2, filed on Oct. 31, 2019, which is incorporated herein by reference in its entirety.

FIELD OF THE INVENTION

The present invention generally relates to the field of power electronics, and more particularly to switching converters, control circuits, and associated methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

BRIEF DESCRIPTION OF THE DRAWINGS

FIG. 6 is a table of example operation of a first counting circuit, in accordance with embodiments of the present invention.

FIG. 7 is a table of example operation of a second counting circuit, in accordance with embodiments of the present invention.

DETAILED DESCRIPTION

Figure 1:
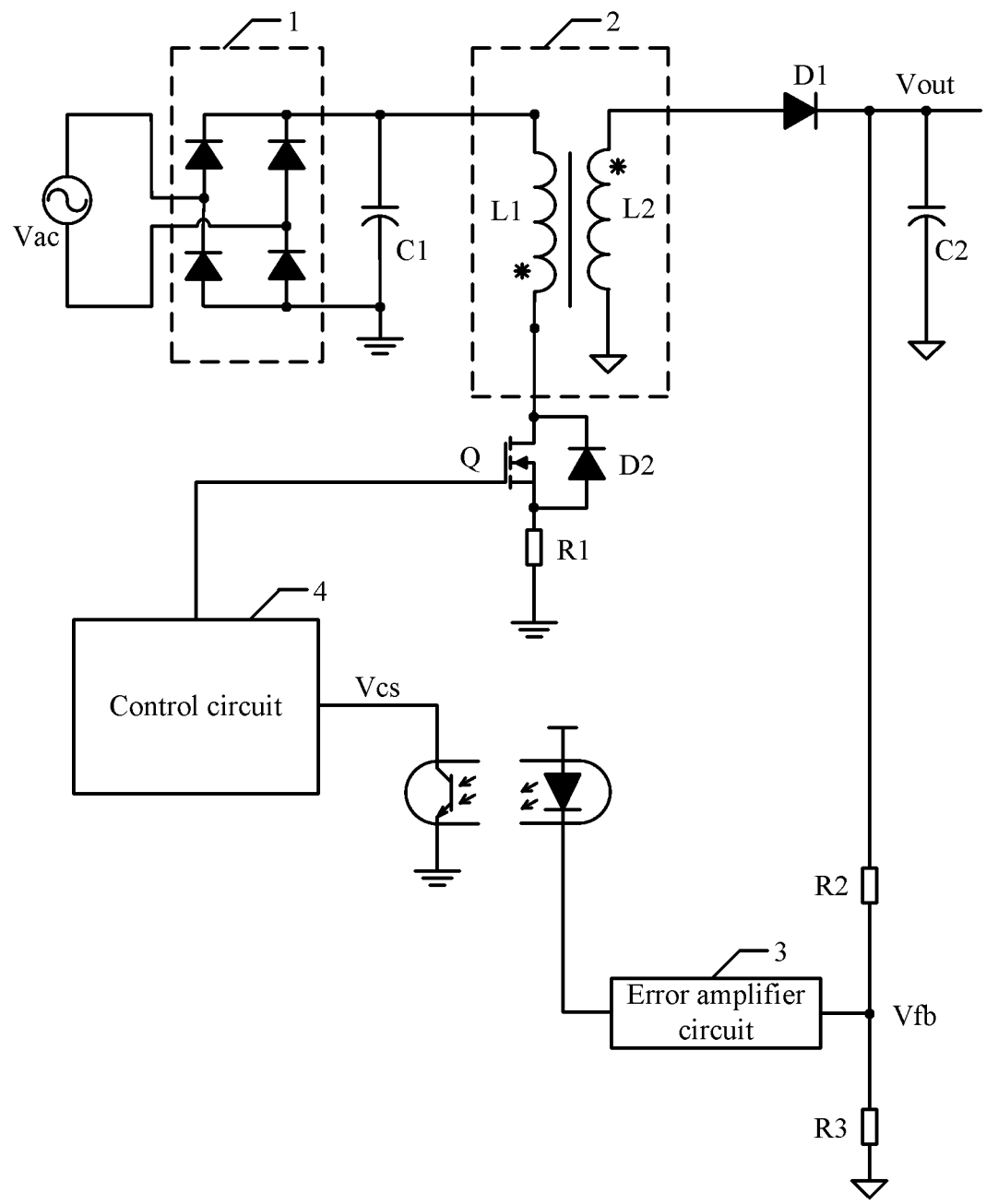
FIG. 1 is a schematic block diagram of an example switching converter, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Flyback converters are often utilized for applications in low-power DC/DC power conversion. When the flyback converter operates in a quasi-resonant mode, the power switch is turned on when a drain-source voltage reaches the tough, thereby achieving higher conversion efficiency and lower electromagnetic interference (EMI), such that this control mode is widely applied. A "trough" as used herein is a valley or local minimum in a waveform. However, since the flyback converter usually operates under frequency control, when it is turned on under discontinuous mode, the frequency control point may not correspond to the trough of the resonance waveform of the drain-source voltage, thereby causing vibrations at a turn-on moment. In other words, the power switch can be turned on alternatingly at two consecutive troughs. When the frequencies of the alternating turn-on points are within the audible frequency range, there can be significant sound noise, thus hindering the performance of the converter.

One approach for preventing vibrations at the trough turn-on points is to detect the switching frequency for a preset duration to determine a trough at which the power switch is turned on in the subsequent preset duration, such that the switching frequency can be limited by that locked trough for a certain time period, and thereby preventing the power switch from being turned on at two consecutive troughs alternately. However, this approach may still be limited by the switching frequency. When the ripple of an input voltage is relatively large, the frequency fluctuation may still be considerably large, such that a suitable turn-on trough may not be locked accurately.

In one embodiment, a control circuit for controlling a power stage circuit of a switching converter, where the power stage circuit includes a magnetic component and a power switch, can include: the control circuit being configured to determine a turn-on trough of a current cycle by determining whether a time signal corresponding to a lock-on trough of the current cycle is within a threshold range, thereby controlling the power switch to be turned on at the determined turn-on trough; and whereby an ordinal number of the lock-on trough of the current cycle is the same as an ordinal number of the turn-on trough of the last cycle.

In one embodiment, a method of controlling a power stage circuit of a switching converter, where the power stage circuit comprises a magnetic component and at least one power switch, can include: determining a threshold range; determining a turn-on trough of a current cycle by determining whether a time signal corresponding to a lock-on trough of the current cycle is within the threshold range; generating a turn-on signal at the turn-on trough to control the power switch to be turned on; and where an ordinal number of the lock-on trough of the current cycle is the same as an ordinal number of the turn-on trough of the last cycle.

Referring now to FIG. 1, shown is a schematic block diagram of an example switching converter, in accordance with embodiments of the present invention. In this particular example, the switching converter is a flyback converter including a power stage circuit, a feedback control circuit, and control circuit 4. The power stage circuit can include a magnetic component and a power switch. In this example, the power stage circuit can include rectifier circuit 1, transformer 2, and power switch Q. The feedback control circuit can include error amplifier circuit 3. For example, rectifier circuit 1 can convert AC input voltage Vac into a DC voltage. Transformer 2 can transform the DC voltage, and transmit it to an output terminal of the converter. Error amplifier circuit 3 can generate an error signal based on an output voltage feedback signal that characterizes an output voltage of the converter, where the error signal represents the difference between the output voltage feedback signal and an output voltage reference.

In this particular example, rectifier circuit 1 is a full-bridge rectifier circuit, which can include four diodes. It should be understood that the rectifier circuit shown here is only one example, and other forms of rectifier circuits (e.g., a half-bridge rectifier) can also be applied in certain embodiments. Moreover, it should be understood that although the diodes are used for rectifying in this example, rectifier circuit 1 can also adopt a synchronous rectification method, and may rectify AC input voltage Vac through multiple controlled switches. In this example, the switching converter also can include capacitor C1, which can connect in parallel to output terminals of rectifier circuit 1, in order to filter the output voltage of rectifier circuit 1.

Transformer 2 can include primary winding L1 and secondary winding L2, which transforms the DC voltage generated from rectifier circuit 1 and transmits it to the output terminal of the converter. For example, the magnetic component is primary winding L1 of transformer 2. In addition, power switch Q can utilize any suitable controlled electrical switching devices, such as MOSFET, BJT, or IGBT. Also, diode D2 can connect in parallel with power switch Q. It should be understood that diode D2 can be a separate diode connected in parallel with power switch Q, or the body diode of power switch Q. In this example, the switching converter can also include resistor R1, which can connect between power switch Q and ground.

In this particular example, power switch Q can connect to primary winding L1. When power switch Q is turned on, a current may pass through primary winding L1 storing energy within. Since the polarities of voltages across primary winding L1 and secondary winding L2 of transformer 2 are opposite, diode D1 may not conduct during this cycle, and thus the output power of the converter may be provided by capacitor C2. When power switch Q is turned off, the polarities of the voltages across primary winding L1 and secondary winding L2 of transformer 2 may transition or flip, such that diode D1 can conduct and the energy stored in primary winding L1 may be transmitted through diode D1 toward capacitor C2 and the load.

In addition, the feedback control circuit can also include an output signal sampling circuit, which can include resistors R2 and R3, and may sample the output voltage to obtain output voltage feedback signal Vfb. In this example, error amplifier circuit 3 can generate error signal Vcs based on the difference between output voltage feedback signal Vfb and the output voltage reference, and error signal Vcs may then be transmitted from the secondary side to the primary side of the transformer via an optocoupler.

Control circuit 4 can generate a discontinuous time reference signal, and generate a trough detection signal by detecting the trough of the oscillation waveform of the voltage across power switch Q after transformer 2 is demagnetized, such that the turn-on trough can be accurately determined based on the discontinuous time reference signal, the trough detection signal, and a lock-on trough of the current cycle. Then, power switch Q can be turned on at the determined turn-on trough. In this example, an ordinal number of the lock-on trough of the current cycle can be the same as an ordinal number of the turn-on trough of the last cycle. Simultaneously, control circuit 4 can also adjust the output power of the converter through closed-loop, negative feedback regulation, such that the desired output power can be achieved when operation condition (e.g., input voltage and/or output current) changes.

In this example, control circuit 4 can determine the discontinuous time reference signal based on a compensation signal generated according to error signal Vcs, and then may determine the turn-on trough based on the discontinuous time reference signal and the lock-on trough of the current cycle, thereby generating a turn-on signal at the turn-on trough to control power switch Q to be turned on. Here, the discontinuous time reference signal can represent reference time Tref, which is the desired discontinuous time for power switch Q. The discontinuous time is an interval after the current flowing through the secondary winding of the transformer has decreased to zero until power switch Q is turned on again.

Figure 2:
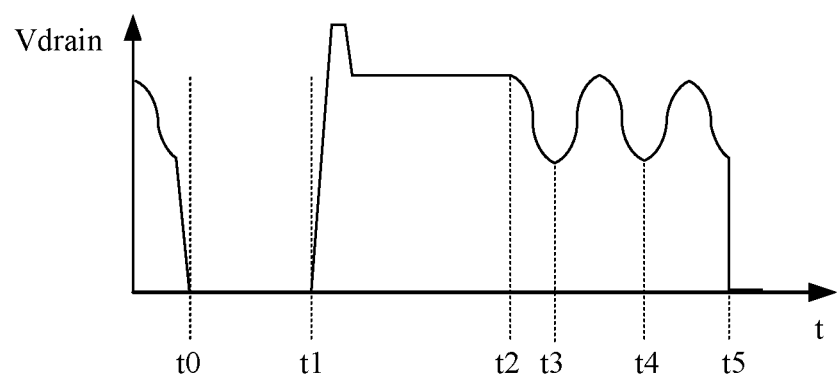
FIG. 2 is a waveform diagram of example operation of the switching converter, in accordance with embodiments of the present invention.

Referring now to FIG. 2, shown is a waveform diagram of example operation of the switching converter, in accordance with embodiments of the present invention. This example shows drain-source voltage Vdrain of power switch Q (vertical axis) against time t (horizontal axis). Here, time interval t0-t1 is the interval for which power switch Q is on, time interval t1-t2 is the interval for which energy stored in transformer 2 is being released (e.g., the interval for which diode D1 is on), and time interval t2-t5 is the discontinuous time (e.g., the interval after the current that flows through the secondary winding of the transformer has decreased to zero until power switch Q is turned on again). For the flyback converter, at time t2, after the secondary side has stopped discharging (e.g., after the transformer is demagnetized), the drain-source voltage of power switch Q can vibrate as shown in FIG. 2, since the parasitic capacitor of power switch Q May resonate with the resistors and inductors in the circuit. Therefore, when power switch Q is turned on again at the trough of the corresponding resonant waveform, it can greatly decrease the switching loss.

In this example, the first trough is at time t3, the second trough is at time t4, and the third trough is at time t5, and power switch Q is turned on when the drain-source voltage reaches the third trough. However, since the load may change (e.g., from heavy to light load), the determined trough for turning on the power switch may need to be adjusted to adjust the switching frequency, thereby increasing the efficiency. Usually, the trough at which the power switch is controlled to be turned on can be controlled by controlling the switching frequency. However, when the ripple of the input voltage is relatively large, the frequency fluctuations may still be considerably large, making the turn-on trough of the current cycle different with the turn-on trough of the last cycle, and thus causing vibrations at the trough turn-on point. In the embodiments, the control circuit can control power switch Q to be turned on by controlling discontinuous time (t2-t5) of power switch Q in a discontinuous conduction mode (DCM) based on the discontinuous time reference signal. Therefore, the influence of the switching frequency on the locked turn-on trough may be reduced, the desired turn-on trough can be locked more accurately, the occurrences of vibration at the turn-on point can substantially be avoided, and the sound noise can also be substantially avoided.

Figure 3:
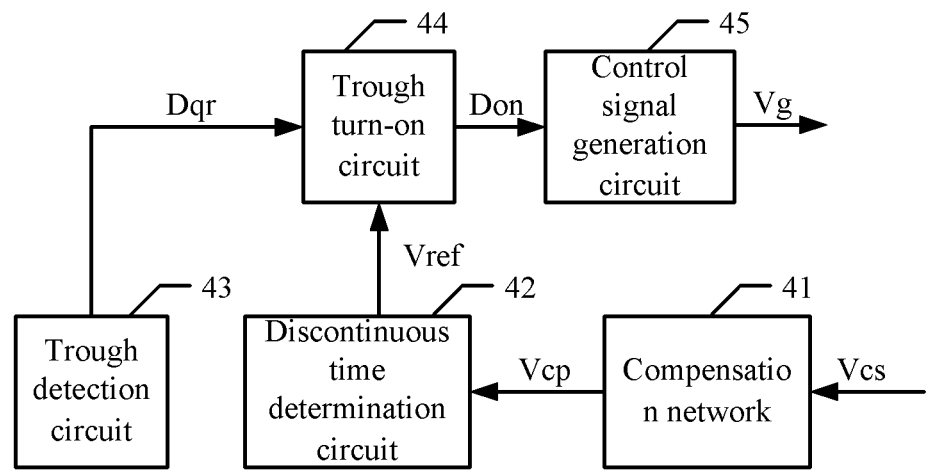
FIG. 3 is a schematic block diagram of an example control circuit of the switching converter, in accordance with embodiments of the present invention.

Referring now to FIG. 3, shown is a schematic block diagram of an example control circuit of the switching converter, in accordance with embodiments of the present invention. For example, control circuit 4 can include compensation network 41, discontinuous time determination circuit 42, trough detection circuit 43, trough turn-on circuit 44, and control signal generation circuit 45. Here, compensation network 41 can generate compensation signal Vcp based on error signal Vcs. Further, compensation network 41 can include appropriate resistors and capacitors. Discontinuous time determination circuit 42 can determine discontinuous time reference signal Vref based on compensation signal Vcp. Further, discontinuous time determination circuit 42 can determine discontinuous time reference signal Vref based on a relationship between compensation signal Vcp and discontinuous time reference signal Vref. Trough detection circuit 43 can detect the trough of the resonant waveform of the voltage across power switch Q after the magnetic component is demagnetized, and may generate trough detection signal Dqr when each trough is detected or is approaching. Trough turn-on circuit 44 can determine the turn-on trough based on discontinuous time reference signal Vref, trough detection signal Dqr and the lock-on trough of the current cycle, and may generate turn-on signal Don at the turn-on trough. Control signal generation circuit 45 can generate control signal Vg based on turn-on signal Don to control power switch Q to be turned on and then the switching converter enters into the next cycle.

Figure 4:
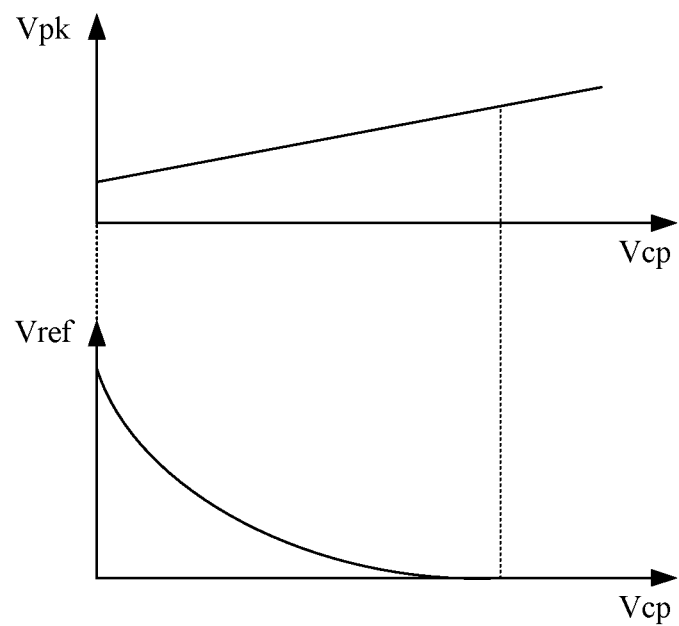
FIG. 4 is a waveform diagram of an example peak current control, in accordance with embodiments of the present invention.

Referring now to FIG. 4, shown are graphs of example relationship between the compensation signal and the discontinuous time reference signal, and example relationship between the compensation signal and the peak current, in accordance with embodiments of the present invention. Under a heavy load, changes in the discontinuous time may have a relatively large impact on the output power, while under a light load, changes in the discontinuous time may have a relatively small impact. Thus, in this example, discontinuous time reference signal Vref can change oppositely with the change of compensation signal Vcp; that is, discontinuous time reference signal Vref increases as compensation signal Vcp decreases. Further, a change rate of discontinuous time reference signal Vref can increase as compensation signal Vcp decreases. It should be understood that the relationship curve between compensation signal Vcp and discontinuous time reference signal Vref can be preset according to particular applications.

The relationship curve between compensation signal Vcp and peak current sampling voltage Vpk is also shown in FIG. 4, where peak current sampling voltage Vpk represents a peak value of the current that passes through power switch Q. In this example, the switching converter can operate under the peak current control mode. The control circuit can control the conduction time of the power switch by regulating the peak value of the current that passes through power switch Q, such that the energy stored in the primary side of the transformer can meet the desired output power. In another implementation, the switching converter can operate under the on-time control mode, whereby the conduction time for power switch Q can be directly set according to compensation signal Vcp, such that the energy stored in the primary side of the transformer can meet the desired output power.

Figure 5:
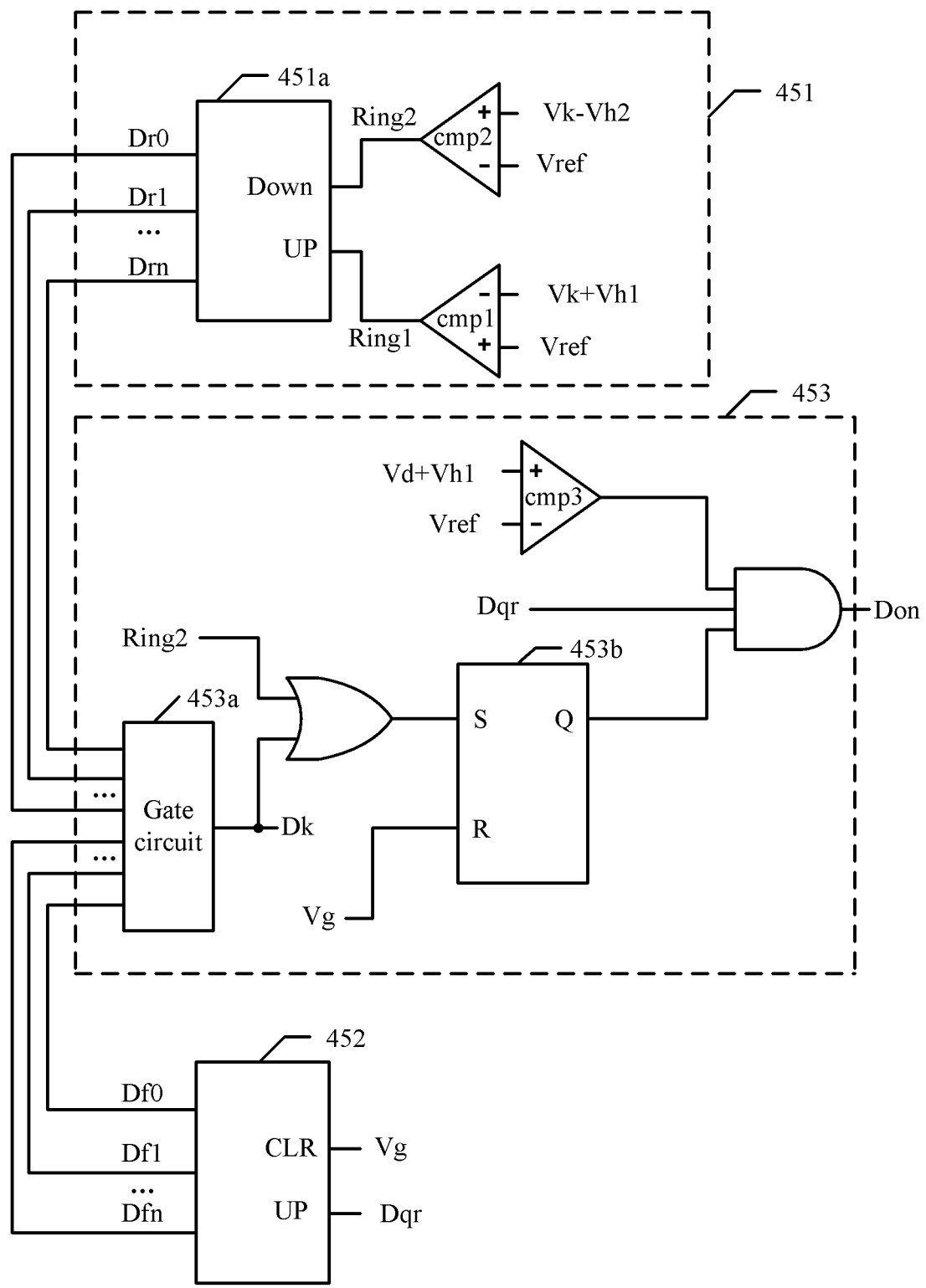
FIG. 5 is a schematic block diagram of an example trough turn-on circuit, in accordance with embodiments of the present invention.

Referring now to FIG. 5, shown is a schematic block diagram of an example trough turn-on circuit, in accordance with embodiments of the present invention. The trough turn-on circuit can include counting circuit 451, counting circuit 452, and turn-on signal generation circuit 453. In this example, counting circuit 451 can generate determined trough value Dr of the current cycle based on discontinuous time reference signal Vref and the lock-on trough of the current cycle. Counting circuit 452 can generate current trough value Df based on trough detection signal Dqr. Turn-on signal generation circuit 453 can generate turn-on signal Don based on current trough value Df and determined trough value Dr. Here, determined trough value Dr may represent the ordinal number of the turn-on trough of the current cycle.

For example, when time signal Vk corresponding to the lock-on trough of the current cycle is within a threshold range determined by discontinuous time reference signal Vref, counting circuit 451 can control the determined trough value of the current cycle to be equal to the determined trough value of the last cycle. Furthermore, the determined trough value of the current cycle can be controlled to be one plus the determined trough value of the last cycle when time signal Vk is less than a lower limit of the threshold range. Moreover, the determined trough value of the current cycle can be controlled to be one less than the determined trough value of the last cycle when time signal Vk is greater than an upper limit of the threshold range. Here, the lower limit may be the difference between discontinuous time reference signal Vref and hysteresis signal Vh1, and the upper limit can be the sum of discontinuous time reference signal Vref and hysteresis signal Vh2.

In this particular example, counting circuit 451 can include comparator cmp1, comparator cmp2, and bidirectional counter 451a. For example, comparator cmp1 can generate comparison signal Ring1 based on discontinuous time reference signal Vref and a first reference signal. Comparator cmp2 can generate comparison signal Ring2 based on discontinuous time reference signal Vref and a second reference signal. Here, the first reference signal can be the sum of lock-on time signal Vk and hysteresis signal Vh1, and the second reference signal can be the difference between lock-on time signal Vk and hysteresis signal Vh2. Bidirectional counter 451a can generate determined trough value Dr of the current cycle based on first and second comparison signals Ring1 and Ring2. In this example, lock-on time signal Vk may be the time signal corresponding to the lock-on trough of the current cycle.

For example, determined trough value Dr of the current cycle generated by counting circuit 451 can be one plus the determined trough value of the last cycle, when discontinuous time reference signal Vref is greater than the first reference signal, and may be one less than the determined trough value of the last cycle when discontinuous time reference signal Vref is less than the second reference signal. Moreover, when discontinuous time reference signal Vref is between the first and second reference signals, the determined trough value of the current cycle may be equal to the determined trough value of the last cycle.

Moreover, hysteresis signal Vh1 can represent hysteresis interval Th1, while hysteresis signal Vh2 may represent hysteresis interval Th2. Here, hysteresis intervals Th1 and Th2 can be predetermined, such that the determined turn-on trough is not changed when the time period corresponding to the lock-on trough of the current cycle is between (Tref−Th1, Tref+Th2). For example, under the heavy load, the ripple of the input voltage can be large, but the change rate of discontinuous time reference signal Vref may be small, such the change in discontinuous time reference signal Vref is relatively small. Under the light load, the ripple of the input voltage can be relatively small and the change in discontinuous time reference signal Vref may be small, such that hysteresis intervals Th1 and Th2 can be set to be relatively small, which is beneficial to the consistency of the operation points when the load changes.

For example, a non-inverting input terminal of comparator cmp1 can receive discontinuous time reference signal Vref and an inverting input terminal receives the first reference signal (Vk+Vh1). When discontinuous time reference signal Vref is greater than the first reference signal, comparison signal Ring1 generated by comparator cmp1 may be active (e.g., at a high level). In addition, a non-inverting input terminal of comparator cmp2 can receive the second reference signal (Vk−Vh2) and an inverting input terminal receives discontinuous time reference signal Vref. When discontinuous time reference signal Vref is less than the second reference signal, comparison signal Ring2 generated by comparator cmp2 may be active.

In some embodiments, the control circuit can also include a timing circuit configured to start timing when the voltage across the power switch starts oscillating after the transformer is demagnetized, and end timing when lock-on signal Dk is active, thereby generating lock-on time signal Vk of the current cycle, which may be used for comparators cmp1 and cmp2 as a control variable during the next cycle. That is to say, lock-on time signal Vk of the current cycle can actually be the time signal corresponding to the turn-on trough determined in the last cycle. The timing circuit can be realized by any suitable timing circuits in certain embodiments.

In some embodiments, there may be no need to register the time signal corresponding to the turn-on trough of the last cycle, and only the ordinal number of the turn-on trough of the last cycle can be registered, such that lock-on signal Vk may change in real time in the current cycle. In such a case, take the turn-on trough of the last cycle is the third trough as an example. During the current cycle, if the upper limit (Vref+Vh2) has arrived before the third trough of the current cycle appears, it can indicate that lock-on time signal Vk is greater than Vref+Vh2, so comparison signal Ring2 is active. If the third trough of the current cycle has appeared and the low limit Vref−Vh1 has not been reached, comparison signal Ring1 can be active.

Additionally, bidirectional counter 451a can include a DOWN pin and an UP pin, and may generate determined trough value Dr. Determined trough value Dr can be increased by one when the UP pin is active, and may be decreased by one when the DOWN pin is active. That is to say, determined trough value Dr of the current cycle can be as one plus the determined trough value of the last cycle when comparison signal Ring1 is active, and may be as one less than the determined trough value of the last cycle when comparison signal Ring2 is active. When both comparison signals Ring1 and Ring2 are inactive (e.g., at a low level), determined trough value Dr of the current cycle may be the same as determined trough value Dr of the last cycle. In addition, bidirectional counter 451a can also be referred to as an up/down counter, which can count both up or down for any given counting sequence and change directions at any given point in the sequence. In this example, determined trough value Dr generated by bidirectional counter 451a is in a binary format with n+1 bits (Dr0, Dr1, . . . , Drn) as an example for explanation.

Referring now to FIG. 6, shown is a table of example operation of the first counting circuit, in accordance with embodiments of the present invention. In this example, determined trough value Dr of the current cycle generated by bidirectional counter 451a is in binary format. For instance, if determined trough value Dr of the current cycle is 3, then the output signal (Drn . . . Dr2 Dr1 Dr0) can be (0 . . . 0 1 1). It should be understood that the bidirectional counter can be realized by any suitable bidirectional counter chips, and it can also be realized via flip-flops and/or other gate circuit designs. As described above, determined trough value Dr of the current cycle can be set as the same as determined trough value Dr of the last cycle when lock-on time signal Vk is within the threshold range of (Vref−Vh1, Vref+Vh2). That is to say, when the change in the output voltage is within a certain range, determined trough value Dr of the current cycle can be constant, thereby preventing the turn-on point of the switching converter from vibrating.

In this example, counting circuit 452 is an up counter having a CLK pin and an UP pin, and current trough value Dk generated by counting circuit 452 may be increased by one for every pulse signal received by the UP pin. For example, trough detection circuit 43 can generate trough detection signal Dqr when the trough of the oscillation waveform of the voltage across power switch Q after the magnetic component is demagnetized is detected or is approaching. Then, current trough value Df can be increased by one when trough detection signal Dqr is active. In this example, current trough value Dk generated by counting circuit 452 can be output in binary format with n+1 bits (e.g., Dfn . . . Df2 Df1 Df0), as an example.

Referring now to FIG. 7, shown is a table of example operation of the second counting circuit, in accordance with embodiments of the present invention. In this particular example, counting circuit 452 can generate current trough value Df of the current cycle in binary format. For instance, if current trough value Df of the current cycle is 3, then the output signal of counting circuit 452 will be (0 . . . 0 1 1). Further, turn-on signal generation circuit 453 can also generate turn-on signal Don after current discontinuous time Td of the power switch is within the threshold range.

For example, turn-on signal generation circuit 453 can include comparator cmp3, a trigger signal generation circuit, and a logic circuit. Comparator cmp3 can generate a third comparison signal based on discontinuous time reference signal Vref and signal Vd representing current discontinuous time Td, in order to determine whether current discontinuous time Td exceeds Tref−Th1. The trigger signal generation circuit can generate a trigger signal based on comparison signal Ring2, determined trough value Dr of the current cycle, and current trough value Df. The logic circuit can generate turn-on signal Don based on the third comparison signal, trough detection signal Dqr, and the trigger signal.

In this example, a non-inverting input terminal of comparator cmp3 can receive the sum of signal Vd and hysteresis signal Vh1, and an inverting input terminal can receive discontinuous time reference signal Vref, such that the third comparison signal is active when discontinuous time reference signal Vref is less than the sum of signal Vd and hysteresis signal Vh1. In this example, the trigger signal generation circuit can include gate circuit 453a, a second gate circuit, and trigger 453b. Here, gate circuit 453a can generate determined signal Dk of the current cycle based on current trough value Df and determined trough value Dr of the current cycle. The second gate circuit can include an OR-gate and may generate a set signal based on comparison signal Ring2 and lock-on signal Dk. Also, trigger 453b can generate the trigger signal based on the set signal. Further, lock-on signal Dk generated by gate circuit 453a can be active when current trough value Df and determined trough value Dr of the current cycle are the same.

Figure 8:
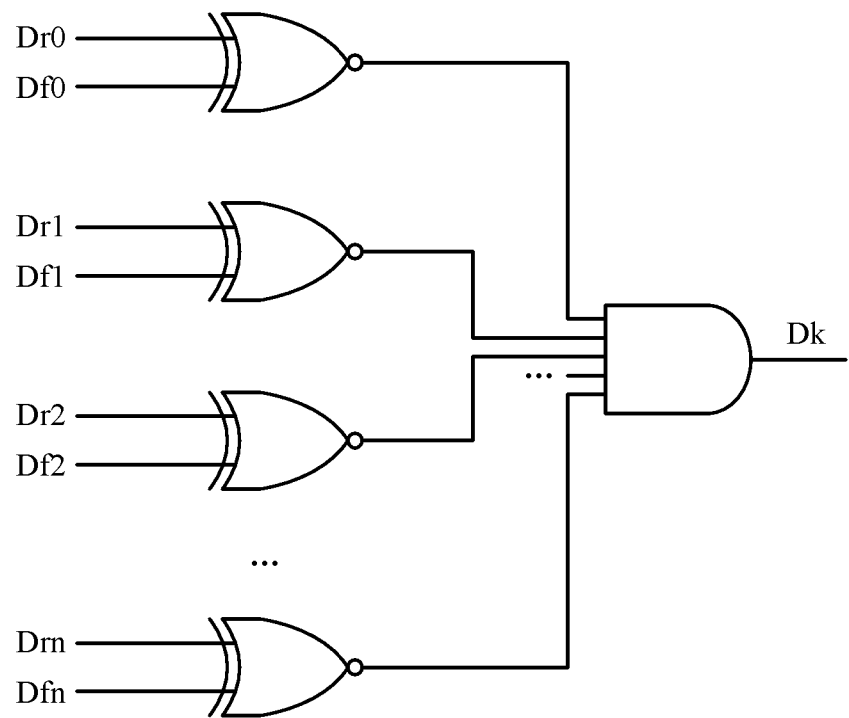
FIG. 8 is a schematic block diagram of an example gate circuit, in accordance with embodiments of the present invention.

Referring now to FIG. 8, shown is a schematic block diagram of an example first gate circuit, in accordance with embodiments of the present invention. In this example, current trough value Df and determined trough value Dr are shown in binary format with n+1 bits as an example for explanation. The first gate circuit (e.g., 453a) can include multiple exclusive-NOR gates and one AND-gate, where input signals of the $i^{th}$ exclusive-NOR gate are Dri and Dfi, and input signals of the AND-gate are all of output signals of the exclusive-NOR gates. As such, lock-on signal Dk of the AND-gate is active only when all the output signals of the exclusive-NOR gates are also active. That is to say, lock-on signal Dk is active when current trough value Df and determined trough value Dr are exactly equal to one another, such that the current trough is determined to be the turn-on trough of the current cycle.

In this example, the second gate circuit is a NOR-gate, and input signals of the NOR gate are comparison signal Ring2 and lock-on signal Dk. When comparison signal Ring2 or lock-on signal Dk is active, the set signal generated by the second gate circuit can be active. Further, the trigger is an SR flip-flop including set terminal S and reset terminal R, where set terminal S can receive the set signal and reset terminal R may receive driving signal Vg of the power switch. When the set signal is active, the trigger signal generated by the trigger can be active. When driving signal Vg is active, the SR flip-flop may be reset and the trigger signal can be inactive. In this example, the logic circuit is an AND-gate, and input signals of the AND-gate are the third comparison signal, trough detection signal Dqr, and the trigger signal. When the third comparison signal, trough detection signal Dqr, and trigger signal are all active, turn-on signal Don generated by the AND-gate can be active. Also, control signal generation circuit 45 can generate driving signal Vg to control the switching states of power switch Q according to turn-on signal Don.

Figure 9:
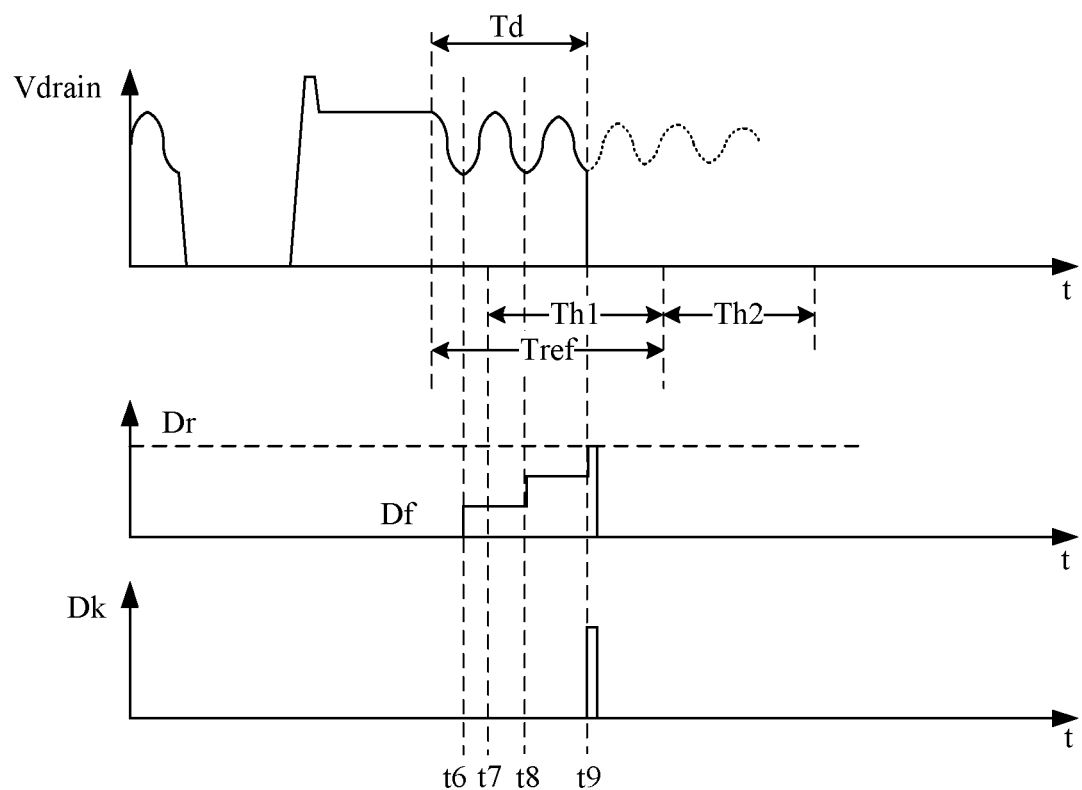
FIG. 9 is a waveform diagram of first example operation of the switching converter, in accordance with embodiments of the present invention.
Figure 10:
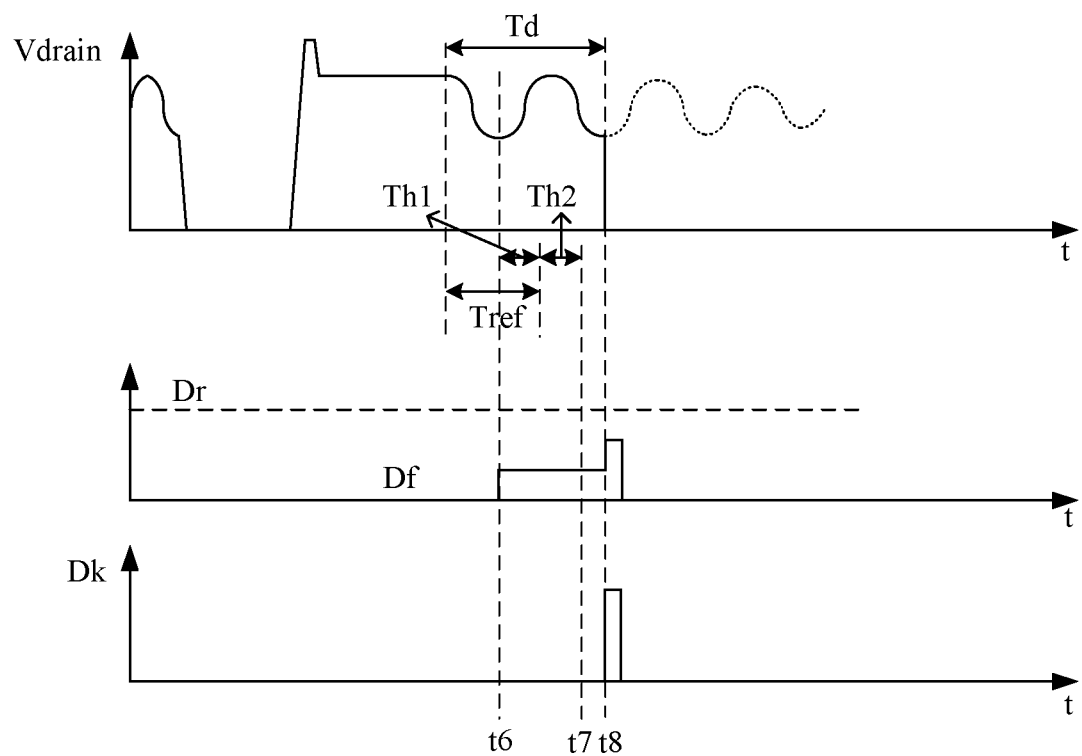
FIG. 10 is a waveform diagram of second example operation of the switching converter, in accordance with embodiments of the present invention.
Figure 11:
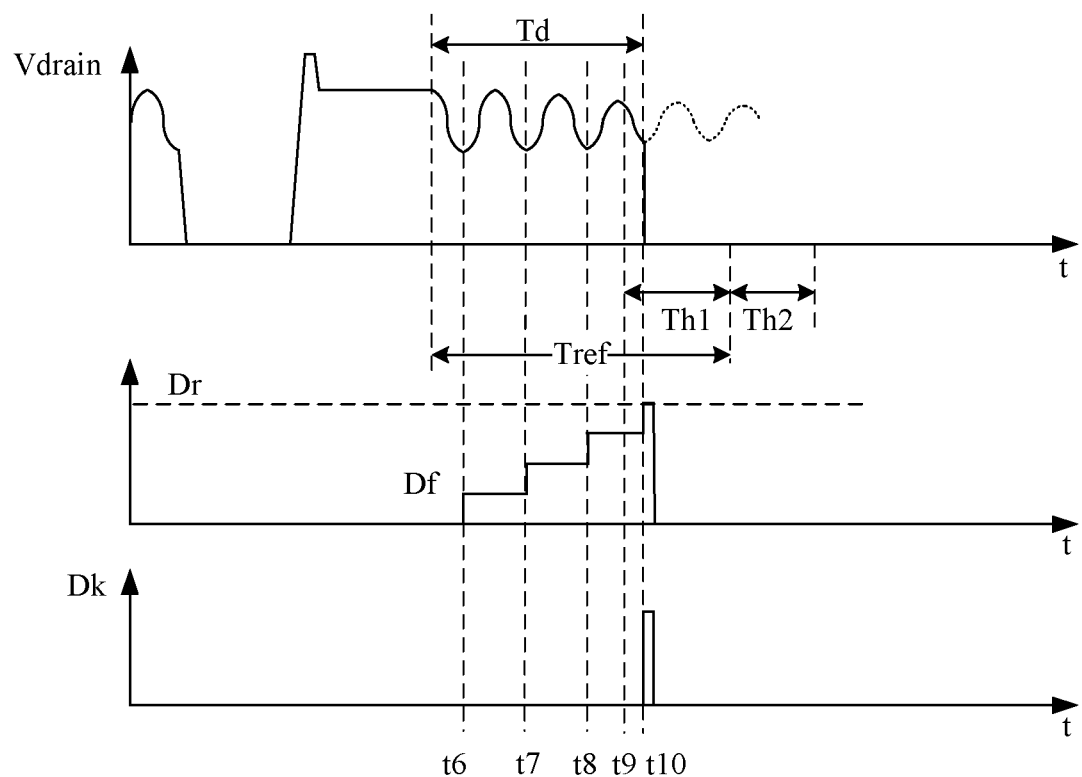
FIG. 11 is a waveform diagram of third example operation of the switching converter, in accordance with embodiments of the present invention.

Referring now to FIGS. 9-11, shown are waveform diagrams of example operation of the switching converter, in accordance with embodiments of the present invention. Here, Vdrain is the drain-source voltage of power switch Q (the voltage across power switch Q), Td represents the current discontinuous time, Th1 is the first hysteresis interval, Th2 is the second hysteresis interval, Tref is the time period corresponding to discontinuous time reference signal Vref, Dr is the determined trough value of the current cycle, and Df is the current trough value. For example, current discontinuous time Td starts after the current passing through the primary winding of the transformer has decreased to zero. It should be understood that the time signals and electrical signals can be converted through the timing circuits. In the first example, as shown in FIG. 9, the turn-on trough of the last cycle is the third trough, and moreover, lock-on time signal Vk of the current cycle is within the threshold range of (Vref−Vh1, Vref+Vh2).

At time t6 (the first trough arrives), current trough value Df at this moment is different from determined trough value Dr of the current cycle, so lock-on signal Dk of the gate circuit 453a is inactive, such that the trigger signal generated by trigger 453b is inactive and turn-on signal Don of the AND-gate may also be inactive. Therefore, power switch Q pay not be turned on. At time t7, the lower limit (Vref−Vh1) can be reached but the third trough has not arrived, so determined trough value Dr be may not be changed. After time t7, the output signal of comparator cmp3 can be active. At time t8 (the second trough arrives), current trough value Df at this moment is different from determined trough value Dr of the current cycle, so lock-on signal Dk of the gate circuit 453a may be inactive, such that the trigger signal is inactive and turn-on signal Don of the AND-gate can also be inactive. Therefore, power switch Q May not be turned on. At time t9 (the third trough arrives), current trough value Df at this moment is the same as determined trough value Dr of the current cycle, so lock-on signal Dk of gate circuit 453a is active, such that the trigger signal is active. Also, trough detection signal Dqr can be active at every trough, such that turn-on signal Don of the AND-gate is also active to control power switch Q to be turned on. That is to say, the third trough has arrived but the upper limit (Vref+Vh2) has not yet been reached, so trough detection signal Dqr of the current cycle can remain the same as trough detection signal Dqr of the last cycle (e.g., =3).

In this example, the turn-on trough of the current cycle may be consistent with the turn-on trough of the last cycle when the lock-on time signal is within the threshold range, thereby reducing the turn-on vibrations of the switching converter. In the second example as illustrated by FIG. 10, the turn-on trough of the last cycle is the third trough, and lock-on time signal Vk is greater than (later than) the upper limit of the threshold range (Vref+Vh2). For example, at time t6 (the first trough arrives), current trough value Df at this moment is different from determined trough value Dr of the current cycle, so lock-on signal Dk of the gate circuit 453a is inactive, such that the trigger signal is inactive and thus turn-on signal Don of the AND-gate is also inactive. Therefore, power switch Q may not be turned on. After time t6, Td+Th1>Tref, and thus the output signal of comparator cmp3 can be active.

Also, trough detection signal Dqr may be active at every trough, such that turn-on signal Don can be decided by the first active one of comparison signal Ring2 and lock-on signal Dk. After time t7, the upper limit may have been reached before the third trough appears; that is, Vk−Vh2>Vref, so comparison signal Ring2 can be active. At this time, determined trough value Dr may be decreased by 1. Also, since comparison signal Ring2 is active, the output signal of the OR-gate can be active, such that the trigger signal generated by the trigger may also be active, independent of lock-on signal Dk. Then, turn-on signal Don can be activated at the first trough after time t7. At time t8 (the second trough arrives), trough detection signal Dqr can be active and thus turn-on signal Don of the AND-gate may be active to control power switch Q to be turned on. In this example, the turn-on trough can be controlled to be at the first trough after the current discontinuous time is greater than the higher limit when the lock-on time signal is greater than the upper limit of the discontinuous time reference signal, thereby achieving fast response of the switching converter.

In the third example as illustrated by FIG. 11, the turn-on trough of the last cycle is the third trough, and lock-on time signal Vk is less than (earlier than) the lower limit of the threshold range (Vref−Vh1). At time t6 (the first trough arrives), current trough value Df at this moment is different from determined trough value Dr of the current cycle, so lock-on signal Dk of the gate circuit 453a is inactive, such that the trigger signal is inactive and thus turn-on signal Don of the AND-gate is also inactive. Therefore, power switch Q may not be turned on. Then, the second trough can arrive at time t7. Similarly, current trough value Df is different from determined trough value Dr of the current cycle, so lock-on signal Dk of gate circuit 453a is inactive, such that the trigger signal is inactive and thus turn-on signal Don of the AND-gate may also be inactive. Therefore, power switch Q may not be turned on. At time t8, the third trough may have arrived, but the lower limit (Vref−Vh1) may not have been reached; that is, Vd+Vh1<Vref, so the output signal of third comparator can be inactive. Thus, turn-on signal Don of the AND-gate may also be inactive. Therefore, power switch Q may not be turned on. In addition, since the third trough has arrived before the lower limit appears, this may indicate that Vk+Vh1<Vref, such that comparison signal Ring1 is active, and comparison signal Ring2 is inactive.

Therefore, determined trough value Dr of the current cycle can be increased by 1 and to be equal to 4. Comparison signal Ring 2 can be inactive, such that the trigger signal generated by the trigger is determined by lock-on signal Dk of the gate circuit 453a. Also, trough detection signal Dqr may be active at every trough. Therefore, turn-on signal Don of the AND-gate is decided by lock-on signal Dk and the output signal of comparator cmp3. That is, turn-on signal Don can be activated at the first trough after the current discontinuous time is greater than the lower limit and after current trough value Df is equal to determined trough value Dr. After time t9, discontinuous time Td can be greater than Tref−Th1, such the output signal of comparator cmp3 is active. At time t10 (the fourth trough arrives), current trough value Df at this moment is the same as determined trough value Dr of the current cycle, so lock-on signal Dk of the gate circuit 453a is active, such that the trigger signal is active and thus turn-on signal Don of the AND-gate is also active. Therefore, power switch Q can be turned on. In this example, when the lock-on time signal is less than the lower limit, the turn-on trough may be increased in the current cycle compared to that in the last cycle, thereby achieving a relatively fast response of the switching converter.

Figure 12:
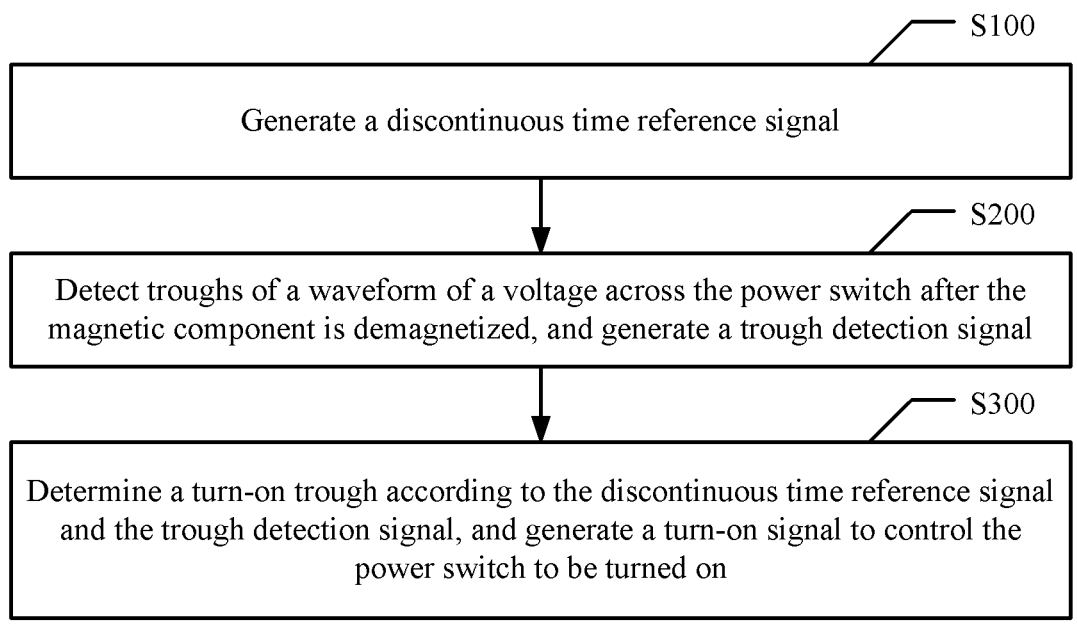
FIG. 12 is a flow diagram of an example control method for the switching converter, in accordance with embodiments of the present invention.

Referring now to FIG. 12, shown is a flow diagram of an example control method for the switching converter, in accordance with embodiments of the present invention. This particular example control method can be used to control the power stage circuit of the switching converter, where the power stage circuit can include a magnetic component and at least one power switch used to control the current flowing through the magnetic component. At S100, a discontinuous time reference signal can be generated. At S200, troughs of a waveform of a voltage across the power switch can be detected after the magnetic component is demagnetized, and a trough detection signal may be generated. At S300, a turn-on trough can be determined according to the discontinuous time reference signal and the trough detection signal, and a turn-on signal may be generated to control the power switch to be turned on.

In an example, the discontinuous time reference signal can be determined according to a corresponding relationship between a compensation signal and the discontinuous time reference signal, where the compensation signal represents the difference between an output voltage of the switching converter and an output voltage reference signal. The example method can also include obtaining a determined trough value of the current cycle according to the discontinuous time reference signal and a lock-on time signal of the current cycle, where the lock-on time signal corresponds to the lock-on trough of the current cycle, and where the ordinal number of the lock-on trough of the current cycle is the same as the ordinal number of the turn-on trough of the last cycle. The example method can also include obtaining a current trough value based on the trough detection signal, and generating the turn-on signal based on the current trough value and the determined trough value of the current cycle to control the power switch to be turned on.

For example, the determined trough value of the current cycle can be controlled to be the same as the determined trough value of the last cycle, when the lock-on time signal is within the threshold range determined by the discontinuous time reference signal. For example, the determined trough value of the current cycle can be controlled to be one plus the determined trough value of the last cycle, when the lock-on time signal is less than a lower limit of the discontinuous time reference signal of the current cycle. For example, the determined trough value of the current cycle may be controlled to be one less than the determined trough value of the last cycle when the lock-on time signal is greater than an upper limit of the discontinuous time reference signal. For example, when the lock-on time signal is less than the lower limit of the discontinuous time reference signal of the current cycle, the turn-on signal may also be generated according to a current discontinuous time of the power switch, where the discontinuous time starts after the magnetic component is demagnetized.

In particular embodiments, an appropriate trough of the waveform of the drain-source voltage of the power switch in the switching converter can be locked as the turn-on trough for the next cycle based on the discontinuous time reference signal, thereby generating the turn-on signal at the turn-on trough to control the power switch to be turned on. By doing so, the turn-on trough can be locked more accurately than other approaches, thereby reducing the influence of the switching frequency on the locked turn-on trough.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for controlling a power stage circuit of a switching converter, the power stage circuit comprising a magnetic component and a power switch, wherein:
  a) the control circuit is configured to determine a turn-on trough of a current cycle by determining whether a time signal corresponding to a lock-on trough of the current cycle is within a threshold range, thereby controlling the power switch to be turned on at the determined turn-on trough;
  b) an ordinal number of the lock-on trough of the current cycle is the same as an ordinal number of the turn-on trough of the last cycle; and
  c) wherein the threshold range is determined based on a discontinuous time reference signal that has an opposite change trend with a compensation signal, the compensation signal represents a difference between an output voltage of the switching converter and an output voltage reference signal and the discontinuous time reference signal is generated according to a corresponding relationship between the compensation signal and the discontinuous time reference signal.

2. The control circuit of claim 1, being configured to:
  a) control the turn-on trough of the current cycle to be consistent with the turn-on trough of the last cycle when the time signal corresponding to the lock-on trough of the current cycle changes within the threshold range; and
b) adjust the turn-on trough of the current cycle when the time signal corresponding to the lock-on trough of the current cycle is beyond the threshold range.

3. The control circuit of claim 1, wherein:
a) when the time signal corresponding to the lock-on trough of the current cycle is greater than an upper limit of the threshold range, the ordinal number of the turn-on trough of the current cycle is decreased to be less than that of the last cycle; and
b) when the time signal corresponding to the lock-on trough of the current cycle is less than a lower limit of the threshold range, the ordinal number of the turn-on trough of the current cycle is increased to be greater than that of the last cycle.

4. The control circuit of claim 1, wherein the control circuit comprises:
a) a discontinuous time determination circuit configured to generate the discontinuous time reference signal;
b) a trough detection circuit configured to detect troughs of a waveform of a voltage across the power switch in each cycle after the magnetic component is demagnetized, and generate a trough detection signal; and
c) a trough turn-on circuit configured to determine the turn-on trough of the current cycle according to the threshold range, the lock-on trough of the current cycle, and the trough detection signal, and to generate a turn-on signal at the turn-on trough to control the power switch to be turned on.

5. The control circuit of claim 4, wherein the trough turn-on circuit comprises:
a) a first counting circuit configured to obtain a determined trough value of the current cycle according to the threshold range determined by the discontinuous time reference signal and a lock-on time signal representing the time signal corresponding to the lock-on trough of the current cycle;
b) a second counting circuit configured to obtain a current trough value based on the trough detection signal; and
c) a turn-on signal generation circuit configured to generate the turn-on signal based on the current trough value and the determined trough value of the current cycle.

6. The control circuit of claim 5, wherein:
a) the turn-on signal generation circuit is configured to generate the turn-on signal after a current discontinuous time is within the threshold range and the current trough value is equal to the determined trough value; and
b) the current discontinuous time starts after the magnetic component is demagnetized.

7. The control circuit of claim 6, wherein when the time signal corresponding to the lock-on signal of the current cycle is greater than an upper limit of the threshold range, the turn-on signal generation circuit is configured to generate the turn-on signal at the first trough after the current discontinuous time is greater than the upper limit.

8. The control circuit of claim 5, wherein the determined trough value of the current cycle is controlled to be the same as the determined trough value of the last cycle, when the lock-on time signal is within the threshold range of the discontinuous time reference signal.

9. The control circuit of claim 5, wherein the determined trough value of the current cycle is controlled to be:
a) one plus the determined trough value of the last cycle, when the lock-on signal is less than a lower limit of the threshold range; and
b) one less than the determined trough value of the last cycle when the lock-on time signal is greater than an upper limit of the threshold range.

10. The control circuit of claim 5, wherein the first counting circuit comprises:
a) a first comparator configured to generate a first comparison signal according to the lock-on time signal and an upper limit of the threshold range;
b) a second comparator configured to generate a second comparison signal according to the lock-on time signal and a lower limit of the threshold range;
c) a bidirectional counter configured to generate the determined trough value of the current cycle based on the first and second comparison signals; and
d) wherein the lower limit is the difference between the discontinuous time reference signal and a first hysteresis signal, and the upper limit is the sum of the discontinuous time reference signal and a second hysteresis signal.

11. The control circuit of claim 10, wherein the turn-on signal generation circuit comprises:
a) a third comparator configured to generate a third comparison signal based on the lower limit of the threshold range and a signal corresponding to a current discontinuous time;
b) a trigger signal generation circuit configured to generate a trigger signal, wherein when the second comparison signal is active or the determined trough value of the current cycle is equal to the current trough value, the trigger signal is active; and
c) a logic circuit configured to generate the turn-on signal based on the third comparison signal, the trough detection signal, and the trigger signal.

12. The control circuit of claim 1, wherein a change rate of the discontinuous time reference signal increases with the decrease of the compensation signal.

13. A method of controlling a power stage circuit of a switching converter, wherein the power stage circuit comprises a magnetic component and at least one power switch, the method comprising:
a) determining a threshold range based on a discontinuous time reference signal that has an opposite change trend with a compensation signal, and the compensation signal represents a difference between an output voltage of the switching converter and an output voltage reference signal wherein the discontinuous time reference signal is generated according to a corresponding relationship between the compensation signal and the discontinuous time reference signal;
b) determining a turn-on trough of a current cycle by determining whether a time signal corresponding to a lock-on trough of the current cycle is within the threshold range;
c) generating a turn-on signal at the turn-on trough to control the power switch to be turned on; and
d) wherein an ordinal number of the lock-on trough of the current cycle is the same as an ordinal number of the turn-on trough of the last cycle.

14. The method of claim 13, further comprising:
a) controlling the turn-on trough of the current cycle to be consistent with the turn-on trough of the last cycle when the time signal corresponding to the lock-on trough of the current cycle changes within the threshold range; and b) adjusting the turn-on trough of the current cycle when the time signal corresponding to the lock-on trough of the current cycle is beyond the threshold range.

15. The method of claim 13, further comprising:

a) decreasing the ordinal number of the turn-on trough of the current cycle to be less than that of the last cycle when the time signal corresponding to the lock-on trough of the current cycle is greater than an upper limit of the threshold range; and b) increasing the ordinal number of the turn-on trough of the current cycle to be greater than that of the last cycle when the time signal corresponding to the lock-on trough of the current cycle is less than a lower limit of the threshold range.

16. The method of claim 13, further comprising:

a) detecting troughs of a waveform of a voltage across the power switch after the magnetic component is demagnetized to generate a trough detection signal; and b) determining the turn-on trough according to the discontinuous time reference signal, the lock-on trough of the current cycle and the trough detection signal.

17. The method of claim 16, further comprising:

a) obtaining a determined trough value of the current cycle according to the threshold range and a lock-on time signal of the current cycle, wherein the lock-on time signal represents the time signal corresponding to the lock-on trough of the current cycle;

b) obtaining a current trough value based on the trough detection signal; and c) generating the turn-on signal based on the current trough value and the determined trough value of the current cycle to control the power switch to be turned on.

* * * * *